United States Patent
Lee et al.

(10) Patent No.: US 8,018,990 B2
(45) Date of Patent: *Sep. 13, 2011

(54) APPARATUS FOR MEASURING IN-PHASE AND QUADRATURE (IQ) IMBALANCE

(75) Inventors: Kyeongho Lee, Seoul (KR); Joonbae Park, Seoul (KR); Jeong Woo Lee, Seoul (KR); Seung-Wook Lee, Seoul (KR); Eal Wan Lee, Seoul (KR)

(73) Assignee: GCT Semiconductor, Inc., San Jose, CA (US)

( * ) Notice: Subject to any disclaimer, the term of this patent is extended or adjusted under 35 U.S.C. 154(b) by 750 days.

This patent is subject to a terminal disclaimer.

(21) Appl. No.: 12/027,742

(22) Filed: Feb. 7, 2008

(65) Prior Publication Data
US 2008/0205502 A1     Aug. 28, 2008

(51) Int. Cl.
H04B 3/46 (2006.01)
(52) U.S. Cl. .......... 375/226; 375/224; 375/329
(58) Field of Classification Search ............... 375/226, 375/224, 329
See application file for complete search history.

(56) References Cited

U.S. PATENT DOCUMENTS

| | | | |
|---|---|---|---|
| 5,949,821 A * | 9/1999 | Emami et al. | 375/235 |
| 6,009,317 A * | 12/1999 | Wynn | 455/296 |
| 6,044,112 A * | 3/2000 | Koslov | 375/235 |
| 6,330,290 B1 * | 12/2001 | Glas | 375/324 |
| 6,574,286 B2 * | 6/2003 | McVey | 375/308 |
| 6,819,910 B2 * | 11/2004 | Shi et al. | 455/126 |
| 7,020,220 B2 * | 3/2006 | Hansen | 375/324 |
| 7,130,359 B2 * | 10/2006 | Rahman | 375/316 |
| 7,151,917 B2 * | 12/2006 | Paulus | 455/302 |
| 7,158,586 B2 * | 1/2007 | Husted | 375/324 |
| 7,295,599 B1 * | 11/2007 | Karsi | 375/219 |
| 7,376,170 B2 * | 5/2008 | Scheck | 375/130 |
| 7,443,783 B2 * | 10/2008 | DeChamps et al. | 370/208 |
| 7,742,539 B2 * | 6/2010 | Fonden et al. | 375/296 |
| 2004/0203472 A1 * | 10/2004 | Chien | 455/68 |
| 2005/0078776 A1 * | 4/2005 | Song et al. | 375/345 |
| 2005/0118963 A1 * | 6/2005 | Chiu | 455/115.1 |
| 2005/0123064 A1 * | 6/2005 | Ben-Ayun et al. | 375/295 |
| 2005/0123067 A1 * | 6/2005 | Kim et al. | 375/298 |
| 2005/0157815 A1 * | 7/2005 | Kim et al. | 375/302 |
| 2006/0009180 A1 * | 1/2006 | Xu et al. | 455/226.1 |
| 2006/0203901 A1 * | 9/2006 | Tan et al. | 375/233 |
| 2006/0256895 A1 * | 11/2006 | Cho | 375/332 |

OTHER PUBLICATIONS

Huang, "Gain/phase imbalance and DC offset compensation in quadrature modulators" 2002 IEEE International Symposium on Circuits and Systems, Issue Date: 2002 on pp. IV-811-IV-814 vol. 4.*
Nezami, "Performance assessment of baseband algorithms for direct conversion tactical software defined receivers: I/Q imbalance correction, image rejection, DC removal, and channelization," MILCOM 2002 Proceedings, vol. 1, Publication Year: 2002, pp. 369-376 vol. 1.*

* cited by examiner

*Primary Examiner* — Juan A Torres
(74) *Attorney, Agent, or Firm* — Muir Patent Consulting, PLLC (57) ABSTRACT

The present general inventive concept relates to apparatuses and/or methods for measuring an in-phase and quadrature (IQ) imbalance. In one embodiment, a detector can measure an error caused by an IQ imbalance using a first IQ signal including a desired signal and a corresponding image signal by the IQ imbalance. The detector can include a derotator to derotate the first IQ signal by a first angular frequency to obtain a second IQ signal and derotate the first IQ signal by a second angular frequency to obtain a third IQ signal, a DC estimator to obtain a fourth IQ signal corresponding to a DC component of the second IQ signal and a fifth IQ signal corresponding to a DC component of the third IQ signal and a controller can determine a gain error or a phase error from the fourth IQ signal and the fifth IQ signal.

23 Claims, 8 Drawing Sheets

APPARATUS FOR MEASURING IN-PHASE AND QUADRATURE (IQ) IMBALANCE

This application claims priority under 35 U.S.C. §119 (a) of Korean Patent Application No. 10-2007-0013037, filed on Feb. 8, 2007, in the Korean Intellectual Property Office, the disclosure of which is incorporated herein by reference in its entirety.

FIELD OF THE INVENTION

The present general inventive concept relates to an apparatus and method for measuring an in-phase and quadrature (IQ) imbalance.

BACKGROUND OF THE INVENTION

A technique for converting a base band signal (hereinafter referred to as "BB signal") or an intermediate frequency signal (hereinafter referred to as "IF signal") to a radio frequency signal (hereinafter referred to as "RF signal") using an IQ mixer or a technique for converting the RF signal to the BB signal or the IF signal is widely used in a field of a wireless communication.

However, an IQ imbalance occurs in a real IQ mixer. The IQ imbalance can include a gain imbalance that occurs because amplitudes of an in-phase signal and a quadrature signal transmitted from a local oscillator to the IQ mixer are not identical, and/or a phase imbalance that occurs because the in-phase signal and the quadrature signal do not have a phase difference of 90°. When the IQ imbalance occurs, an output of the IQ mixer includes an undesirable noise component, which can result in a degradation of a signal-to-noise ratio.

U.S. Pat. No. 5,949,821 by Shahriar Emami titled "METHOD AND APPARATUS FOR CORRECTING PHASE AND GAIN IMBALANCES BETWEEN IN-PHASE(I) AND QUADRATURE(Q) COMPONENTS OF A RECEIVED SIGNAL BASED ON A DETERMINATION OF PEAK AMPLITUDES" and U.S. Pat. No. 6,044,112 by Johua L. Koslov titled "METHOD AND APPARATUS FOR CORRECTING AMPLITUDE AND PHASE IMBALANCES IN DEMODULATORS" disclose related art methods for compensating for IQ imbalance. The patents disclose methods for measuring the IQ imbalance using a received signal transmitted through a wireless communication. However, since IQ imbalance is measured using the received signal in accordance with the method disclosed by the patents, an accuracy of the measured IQ imbalance is degraded because of noise of a wireless channel included in the received signal.

U.S. Pat. No. 7,151,917 by Tod Paulus titled "APPARATUS AND METHOD FOR DERIVING A DIGITAL IMAGE CORRECTION FACTOR IN A RECEIVER" discloses another related art for compensating for an IQ imbalance. In accordance with the patent, a method for measuring the IQ imbalance inputs a test signal to an IQ down-conversion mixer. However, the technique disclosed by the patent requires a separate test signal and/or does not disclose a Tx IQ.

SUMMARY

An object of embodiments of the application is to solve at least the above problems and/or disadvantages or to provide at least the advantages described herein in whole or in part.

Another object of the application to provide an apparatus and method for measuring an IQ imbalance of an IQ mixer.

It is another object of the application to provide an apparatus and method for measuring an IQ imbalance without using a spectrum analyzer or a fast Fourier transformer.

To achieve objects and/or utilities of embodiments of the application in whole or in part, there is provided a phase error detector for measuring an IQ imbalance error using a first IQ signal including a first tone having at a first angular frequency and a second tone having a second angular frequency, the second tone corresponding to an image signal by the IQ imbalance of the first tone, the detector including a derotator to derotate the first IQ signal by the first angular frequency to obtain a second IQ signal and to derotate the first IQ signal by the second angular frequency to obtain a third IQ signal, a DC estimator to obtain a fourth IQ signal corresponding to a DC component of the second IQ signal and a fifth IQ signal corresponding to a DC component of the third IQ signal and a controller to control a first error from the fourth IQ signal and the fifth IQ signal.

To also achieve objects and/or utilities of embodiments of the application in whole or in part, there is provided a detector for measuring a gain error or a phase error by an IQ imbalance using a first IQ signal including a first tone positioned at a first angular frequency and a second tone having a second angular frequency, the second tone corresponding to an image signal by the IQ imbalance of the first tone, the detector including a derotator to derotate the first IQ signal by the first angular frequency to obtain a second IQ signal and to derotate the first IQ signal by the second angular frequency to obtain a third IQ signal, a DC estimator to obtain a fourth IQ signal corresponding to a DC component of the second IQ signal and a fifth IQ signal corresponding to a DC component of the third IQ signal, and a controller to obtain the gain error or the phase error from the fourth IQ signal and the fifth IQ signal.

To also achieve objects and/or utilities of embodiments of the application in whole or in part, there is provided a method for measuring an IQ imbalance error using a first IQ signal including a first signal and a second signal corresponding to an image signal by the IQ imbalance of the first signal, the method including derotating the first IQ signal by a first angular frequency to obtain a second IQ signal and derotating the first IQ signal by a second angular frequency to obtain a third IQ signal, obtaining a fourth IQ signal corresponding to a DC component of the second IQ signal and a fifth IQ signal corresponding to a DC component of the third IQ signal and obtaining the first error such as a gain error or a phase error from the fourth IQ signal and the fifth IQ signal.

To also achieve objects and/or utilities of embodiments of the application in whole or in part, there is provided a method for measuring gain or phase error by an IQ imbalance using a first IQ signal including a first tone positioned at a first angular frequency and a second tone having a second angular frequency, the second tone corresponding to an image signal by the IQ imbalance of the first tone, the method including derotating the first IQ signal by the first angular frequency to obtain a second IQ signal and derotating the first IQ signal by the second angular frequency to obtain a third IQ signal, obtaining a fourth IQ signal corresponding to a DC component of the second IQ signal and a fifth IQ signal corresponding to a DC component of the third IQ signal and obtaining the gain error from the fourth IQ signal and the fifth IQ signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The embodiments will be described in detail with reference to the following drawings in which like reference numerals refer to like elements wherein.

DETAILED DESCRIPTION OF EMBODIMENTS

Embodiments according to the present general inventive concept will be described with reference to the accompanying drawings. Such embodiments are exemplary and not to be construed as limiting. The interpretations of the terms and wordings used in description and claims should not be limited to common or literal meanings. Many alternatives, modifications, and variations will be apparent to those skilled in the art.

Figure 1:
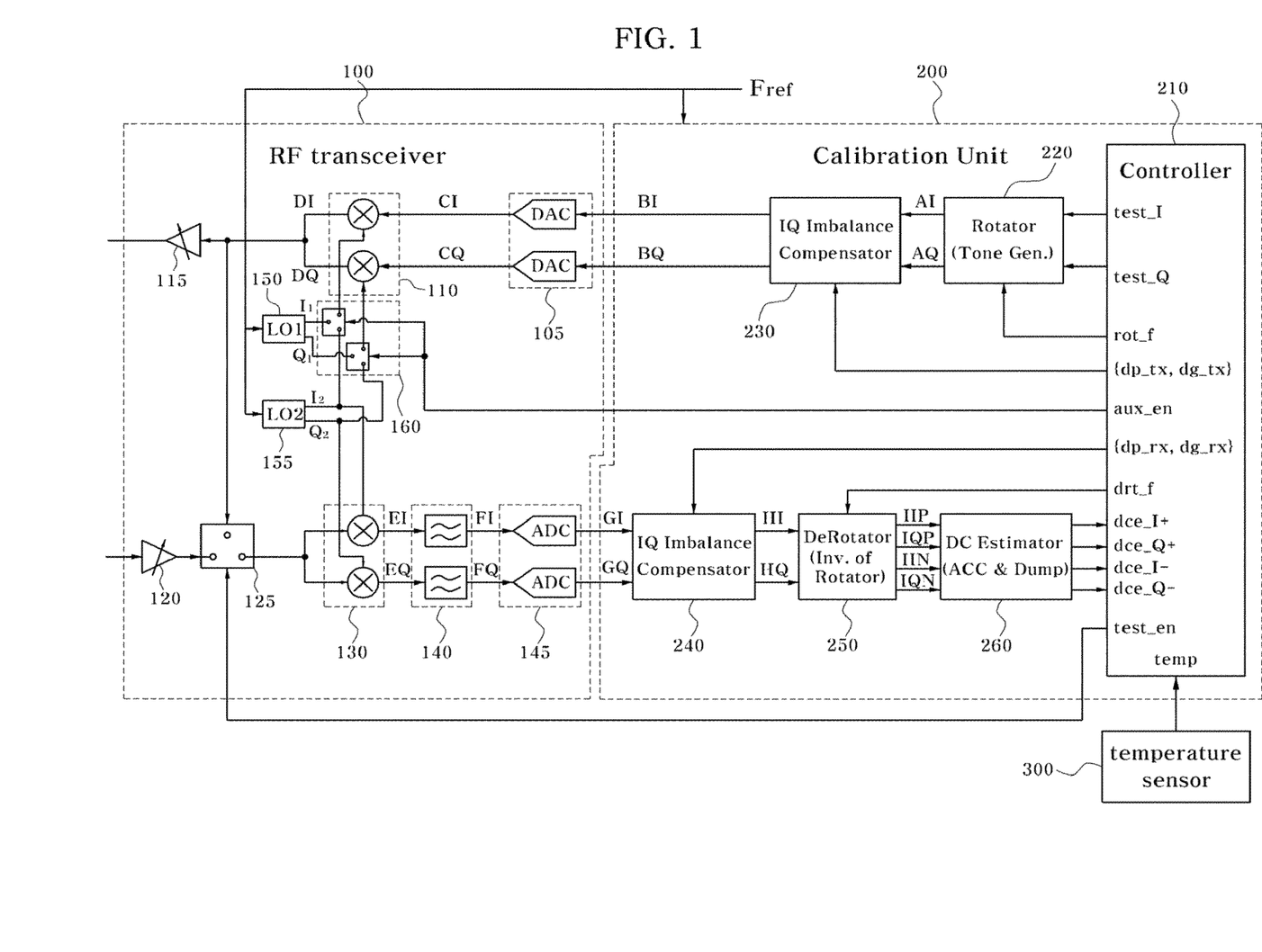
FIG. 1 is a diagram illustrating a transceiving circuit in accordance with an embodiment of the application.

FIG. 1 is a diagram illustrating a transceiving circuit in accordance with a an embodiment of the application. As illustrated to FIG. 1, the transceiving circuit can include an RF transceiver 100 and a calibration unit 200.

The RF transceiver 100 can include an IQ DAC (IQ digital-to-analog converter) 105, an IQ up-conversion mixer 110, a power amplifier 115, a low noise amplifier 120, a feedback switch 125, an IQ down-conversion mixer 130, an IQ filter 140, an IQ ADC (IQ analog-to-digital converter) 145, a first local oscillator 150, a second local oscillator 155 and an IQ switch 160.

The IQ DAC 105 converts digital IQ signals BI and BQ being outputted from the calibration unit 200 to an analog IQ signal. The IQ DAC 105 may include two DACs, wherein one of the DACs is an I channel DAC and the other is a Q channel DAC. An exemplary circuit including the I channel DAC and the Q channel DAC will be referred to as the IQ DAC 105. Similarly, an exemplary circuit including an I channel up-conversion mixer and a Q channel up-conversion mixer will be referred to as the IQ up-conversion mixer 110, and an exemplary circuit including an I channel down-conversion mixer and a Q channel down-conversion mixer will be referred to as the IQ down-conversion mixer 130. In addition, exemplary circuits such as a circuit including an I channel filter and a Q channel filter will be referred to as the IQ filter 140, a circuit including an I channel ADC and a Q channel ADC will be referred to as the IQ ADC 145, and a circuit including an I channel switch and a Q channel switch will be referred to as the IQ switch 160.

The IQ up-conversion mixer 110 up-converts IQ signals CI and CQ transmitted from the IQ DAC 105 to IQ signals DI and DQ, for example, of an RF band. In order to achieve this, the IQ up-conversion mixer 110 combines or multiplies the I channel signal CI being outputted from the IQ DAC 105 to one of a first in-phase signal I1 and a second in-phase signal I2 selected by the IQ switch 160. In addition, the IQ up-conversion mixer 110 multiplies the Q channel signal CQ being outputted from the IQ DAC 105 to one of a first quadrature signal Q1 and a second quadrature signal Q2 selected by the IQ switch 160.

The power amplifier 115 amplifies a transmission signal (e.g., RF) corresponding to a sum of IQ outputs DI and DQ of the IQ up-conversion mixer 110. The amplified transmission RF signal may be transmitted to an antenna (not shown) or the like via a duplexer (not shown) for instance.

The low noise amplifier 120 subjects a received signal (e.g., RF signal) to a low-noise amplification. The received RF signal may be transmitted to the low noise amplifier 120 via the antenna and the duplexer for instance.

The feedback switch 125 can form a feedback loop between a transmission path and a reception path. For example, the feedback switch 125 can feed back the transmission RF signal to the IQ down-conversion mixer 130 during an IQ imbalance measurement period and feed the received RF signal back to the IQ down-conversion mixer 130 during a normal operating period. While an exemplary feedback path formed between an input stage of the power amplifier 115 and an output stage of the low noise amplifier 120 is shown, various modifications are possible to transmit the transmission signal (e.g., RF signal) to the IQ down-conversion mixer 130. For instance, when the feedback path may be formed between an output stage of the power amplifier 115 and an input stage of the low noise amplifier 120. The feedback switch 125 may be controlled by a control signal (e.g., test_en) from a controller 210.

The IQ down-conversion mixer 130 converts the RF signal transmitted from the feedback switch 125 to a BB signal or an IF signal. In order to achieve this, the IQ down-conversion mixer 130 can combine or multiply the RF signal transmitted from the feedback switch 125 to a second in-phase signal I2 and the RF signal transmitted from the feedback switch 125 to a second quadrature signal Q2.

The IQ filter 140 is preferably disposed between the IQ down-conversion mixer 130 and the IQ ADC 145, and may include a low pass filter, a band pass filter or the like.

The IQ ADC 145 converts analog signals FI and FQ being outputted from the IQ filter 140 to digital signals GI and GQ.

The first local oscillator 150 can generate the first in-phase signal I1 and the first quadrature signal Q1 (hereinafter a "first LO signal").

The second local oscillator 155 can generate the second in-phase signal I2 and the second quadrature signal Q2 (hereinafter a "second LO signal"). A frequency of the second in-phase signal I2 and the second quadrature signal Q2 differs from that of the first in-phase signal I1 and the first quadrature signal Q1 by a predetermined frequency. For instance, the frequency of the second in-phase signal I2 and the second quadrature signal Q2 may be 1 MHz smaller than that of the first in-phase signal I1 and the first quadrature signal Q1.

The IQ switch 160 can transmit one of the first in-phase signal I1 and the second in-phase signal I2 selected by a control signal (e.g., control signal aux_en) of the controller 210 to the IQ up-conversion mixer 110, and transmit one of the first quadrature signal Q1 and the second quadrature signal Q2 selected by the control signal to the IQ up-conversion mixer 110. The IQ switch 160 can transmit the second in-phase signal I2 and the second quadrature signal Q2 to the IQ up-conversion mixer 110 since the IQ up-conversion mixer 110 and the IQ down-conversion mixer 130 should multiply a same frequency during the normal operating period (in case of time division duplex) and a period of measuring a Tx/Rx IQ imbalance (or a period of measuring a Tx IQ imbalance). The IQ switch 160 can transmit the first in-phase signal I1 and the first quadrature signal Q1 to the IQ up-conversion mixer 110 since the IQ up-conversion mixer 110 and the IQ down-conversion mixer 130 should multiply different frequencies during the period of measuring an Rx IQ imbalance.

The calibration unit 200 can include the controller 210, a rotator 220, a Tx IQ imbalance compensator 230, an Rx IQ imbalance compensator 240, a derotator 250 and a DC estimator 260. It is preferable that a clock signal being inputted to the calibration unit 200 and a clock signal being inputted to the first local oscillator 150 and the second local oscillator 155 are from a single clock source. As a result, a derotating frequency carried out in the derotator 250 may be controlled. The calibration unit 200 may be embodied in various ways. For example, in one embodiment, the controller 210, the rotator 220, the Tx IQ imbalance compensator 230, the Rx IQ imbalance compensator 240, the derotator 250 and the DC estimator 260 may be embodied by separate digital circuits. In another embodiment, the calibration unit 200 may be embodied using a DSP (digital signal processor) or an MCU (microcontroller unit). In such case, each of the controller 210, the rotator 220, the Tx IQ imbalance compensator 230, the Rx IQ imbalance compensator 240, the derotator 250 and the DC estimator 260 may stand for an operation carried out by the DSP or MCU.

The controller 210 can control the feedback switch 125, the IQ switch 160, the rotator 220, the Tx IQ imbalance compensator 230, the Rx IQ imbalance compensator 240, the derotator 250 and the DC estimator 260 in order to measure the Rx IQ imbalance and Tx/Rx IQ imbalance (or the Tx IQ imbalance). The controller 210 may receive a signal temp corresponding to a temperature from a temperature sensor 300 to re-carry out a process of measuring the IQ imbalance in accordance with a temperature change. For example, the IQ balance may be measured periodically, when a temperature change is greater than a prescribed amount, based on operator command or the like.

The rotator 220 rotates IQ signals (e.g., test_I and test_Q) of a DC component by an amount of predetermined frequency to generate a tone. The predetermined frequency can be determined by a control signal (e.g., control signal rot_f) transmitted from the controller 210. During the normal operating period and the period of measuring the Rx IQ imbalance, the rotator 220 is preferably not in operation. For example, during these periods, the rotator 220 outputs the IQ signals test_and test_Q without the rotation. The rotator 220 can generate the predetermined tone during the period of measuring the Tx/Rx IQ imbalance (or the Tx IQ imbalance).

The Tx IQ imbalance compensator 230 can compensate for the Tx IQ imbalance. For instance, the Tx IQ imbalance compensator 230 is not in operation during the period of measuring the IQ imbalance (e.g., outputs the signal transmitted from the rotator 220 as is), and is in operation during the normal operating period. For example, it is preferable that a signal to be transmitted via the antenna during the normal operating period is transmitted to the power amplifier 115 via the Tx IQ imbalance compensator 230, the IQ DAC 105 and the IQ up-conversion mixer 110.

The Rx IQ imbalance compensator 240 can compensate for the Rx IQ imbalance. For instance, the Rx IQ imbalance compensator 240 is not in operation during the period of measuring the Rx IQ imbalance (e.g., outputs the signal transmitted from the IQ ADC 145 as is), and is in operation during the normal operating period. In addition, the Rx IQ imbalance compensator 240 is not in operation during the period of measuring the Tx/Rx IQ imbalance, and is in operation during the period of measuring the Tx IQ imbalance. It is preferable that a signal received via the antenna during the normal operating period is compensated for the Rx IQ imbalance via the Rx IQ imbalance compensator 240.

The derotator 250 can derotate signals HI and HQ being outputted from the Rx IQ imbalance compensator 240 by an amount of a predetermined frequency. For instance, the derotator 250 is not in operation during the normal operating period (e.g., outputs a signal transmitted from the Rx IQ imbalance compensator 240 without the rotation). During the period of measuring the Rx IQ imbalance, the derotator 250 can derotate the IQ signals HI and HQ being inputted thereto to output IQ signals IIP and IQP obtained by derotating the IQ signals HI and HQ by an amount of $\Delta F$ and IQ signals IIN and IQN obtained by derotating the IQ signals HI and HQ by an amount of $-\Delta F$, where F1 is a frequency of a signal generated by the first local oscillator 150, F2 is a frequency of a signal generated by the second local oscillator 155, and $\Delta F$ is [F1−F2]. In addition, during the period of measuring the Tx/Rx IQ imbalance (or the Tx IQ imbalance), the derotator 250 outputs the IQ signals IIP and IQP obtained by derotating the IQ signals HI and HQ being inputted to the derotator 250 by an amount of $\Delta F$ and IQ signals IIN and IQN obtained by derotating the IQ signals HI and HQ by an amount of $-\Delta F$, where $\Delta F$ is a frequency of a signal generated by the rotator 220.

The DC estimator 260 can determine or extract a DC component of the IQ signals IIP, IQP, IIN and IQN being outputted from the derotator 250. The DC estimator 260 may be embodied using the low pass filter, an accumulator or the like. When the low pass filter is used, each input signal can be outputted after passing through the low pass filter. When the accumulator is used, each input signal can be outputted by passing through the accumulator.

Figure 2:
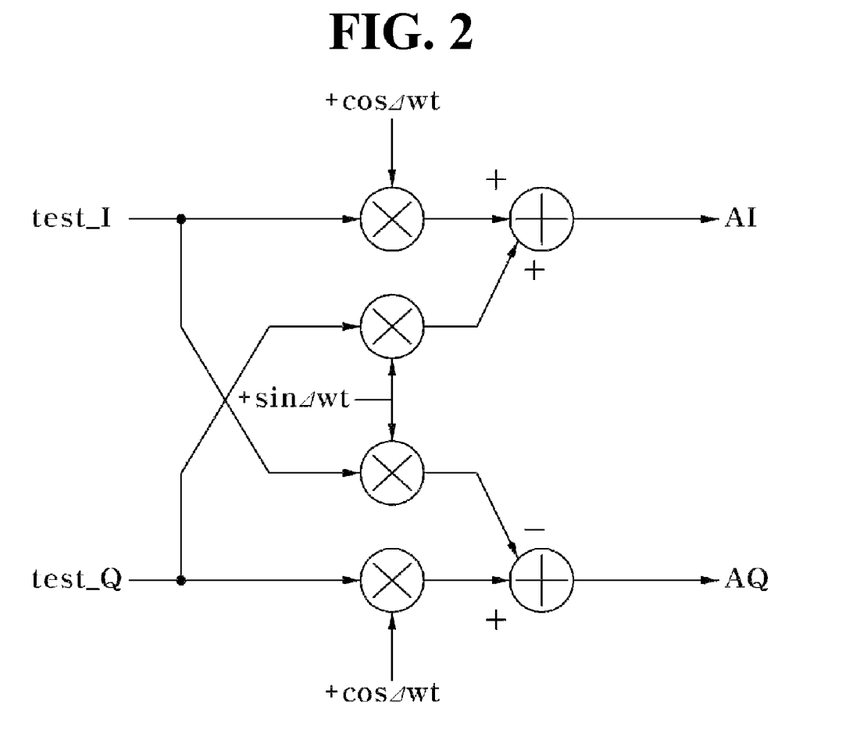
FIG. 2 is a diagram illustrating an example of a rotator of FIG. 1.

FIG. 2 is a diagram illustrating an example of a rotator, which may be used for the rotator 220 of FIG. 1. As illustrated in FIG. 2, the rotator 220 can include four adders, one multiplier and one subtractor. The rotator 220 carries out an operation expressed in equation 1, for example by including components shown.

$$AI = (test\_I \times \cos(\Delta\omega \times t)) + (test\_Q \times \sin(\Delta\omega \times t))$$

$$AQ = (test\_Q \times \cos(\Delta\omega \times t)) - (test\_I \times \sin(\Delta\omega \times t)) \quad \text{[Equation 1]}$$

In accordance with Equation 1, $\Delta\omega$ represents an angular frequency of the tone that is to be outputted by the rotator 220. The controller 210 can output a control signal (e.g., a control signal rot_f) that sets $\Delta\omega$ to zero during the period of measuring the Rx IQ imbalance, and outputs the control signal that sets $\Delta\omega$ to non-zero (a positive value or an negative value) during the period of measuring the Tx/Rx IQ imbalance (or Tx IQ imbalance).

Since a function of the rotator 220 is to generate the tone having the predetermined angular frequency, a constitution of the rotator 220 is not limited to FIG. 2. For instance, the rotator 220 may be configured to simply output $\cos(\Delta\omega \times t)$ and $-\sin(\Delta\omega \times t)$.

Figure 3:
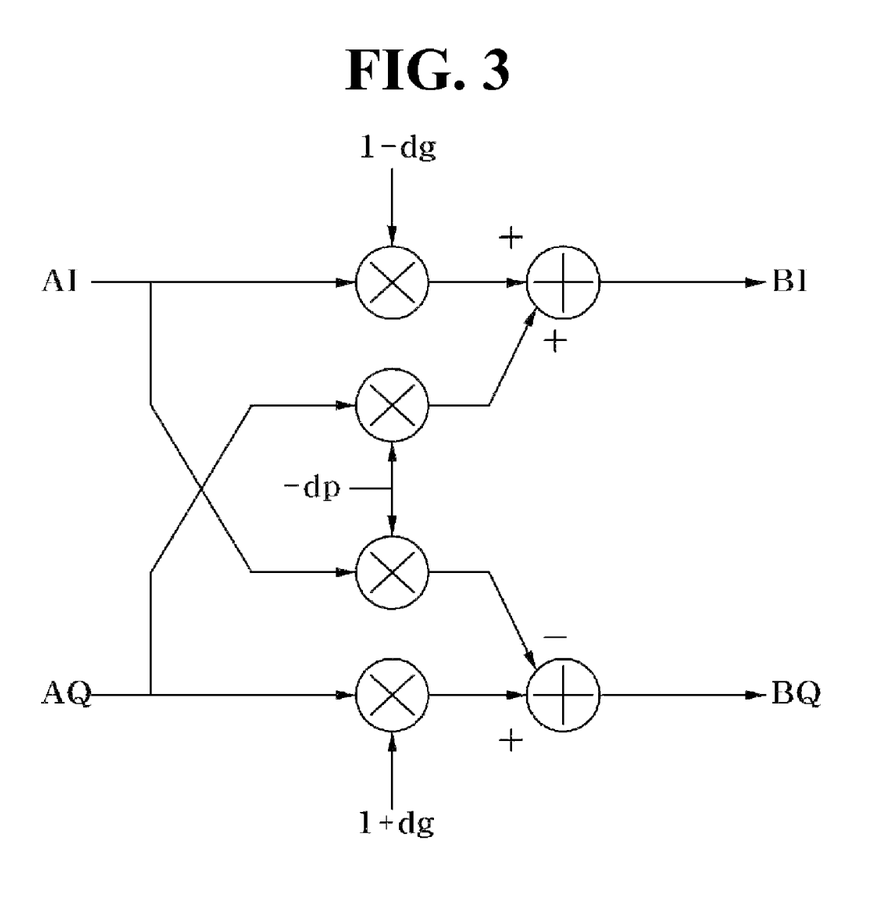
FIG. 3 is a diagram illustrating an example of a Tx IQ imbalance compensator of FIG. 1.

FIG. 3 is a diagram illustrating an example of a compensator, which may be used for the Tx IQ imbalance compensator 230 of FIG. 1. As illustrated in FIG. 3, the Tx IQ imbalance compensator 230 can include four adders and two multipliers. The Tx IQ imbalance compensator 230 carries out an operation expressed in equation 2, for example by including components shown.

$$BI = (AI \times (1-dg)) - (AQ \times dp)$$

$$BQ = (AQ \times (1+dg)) - (AI \times dp) \quad \text{[Equation 2]}$$

In Equation 2, dg represents a value corresponding to a control signal (e.g., control signal dg_tx) transmitted from the controller 210, which corresponds to a gain error due to the Tx IQ imbalance, and dp represents a value corresponding to a control signal (e.g., control signal dp_tx) transmitted from the controller 210, which corresponds to a phase error due to the Tx IQ imbalance. A constitution of the Tx IQ imbalance compensator 230 shown in FIG. 3 is an example of a compensator when the IQ output signals DI and DQ of the IQ up-conversion mixer 110 are illustrated in Equation 3.

$$DI = CI \times (1+dg) \times \cos(\omega \times t - dp)$$

$$DQ = CQ \times (1-dg) \times \sin(\omega \times t + dp) \quad \text{[Equation 3]}$$

In Equation 3, ω can represent an angular frequency of an in-phase signal and a quadrature signal being inputted to the IQ up-conversion mixer 110.

However, the constitution of the Tx IQ imbalance compensator 230 is not limited to that of FIG. 3, and for example, may be varied as expressed in Equations 4 and 5.

$$BI = AI - (AQ \times dp)$$

$$BQ = (AQ - (AI \times dp)) \times (1 + 2 \times dg) \quad \text{[Equation 4]}$$

$$BI = (AI - (AQ \times dp)) \times (1 - 2 \times dg)$$

$$BQ = AQ - (AI \times dp) \quad \text{[Equation 5]}$$

The Rx IQ imbalance compensator 240 may be configured similar to the Tx IQ imbalance compensator 230. However, in the Rx IQ imbalance compensator 240, dg is a value corresponding to a control signal (e.g., a control signal dg_rx) transmitted from the controller 210 that corresponds to the gain error due to the Rx IQ imbalance while dp is a value corresponding to a control signal (e.g., a control signal dp_rx) transmitted from the controller 210 that corresponds to the phase error due to the Rx IQ imbalance.

Figure 4:
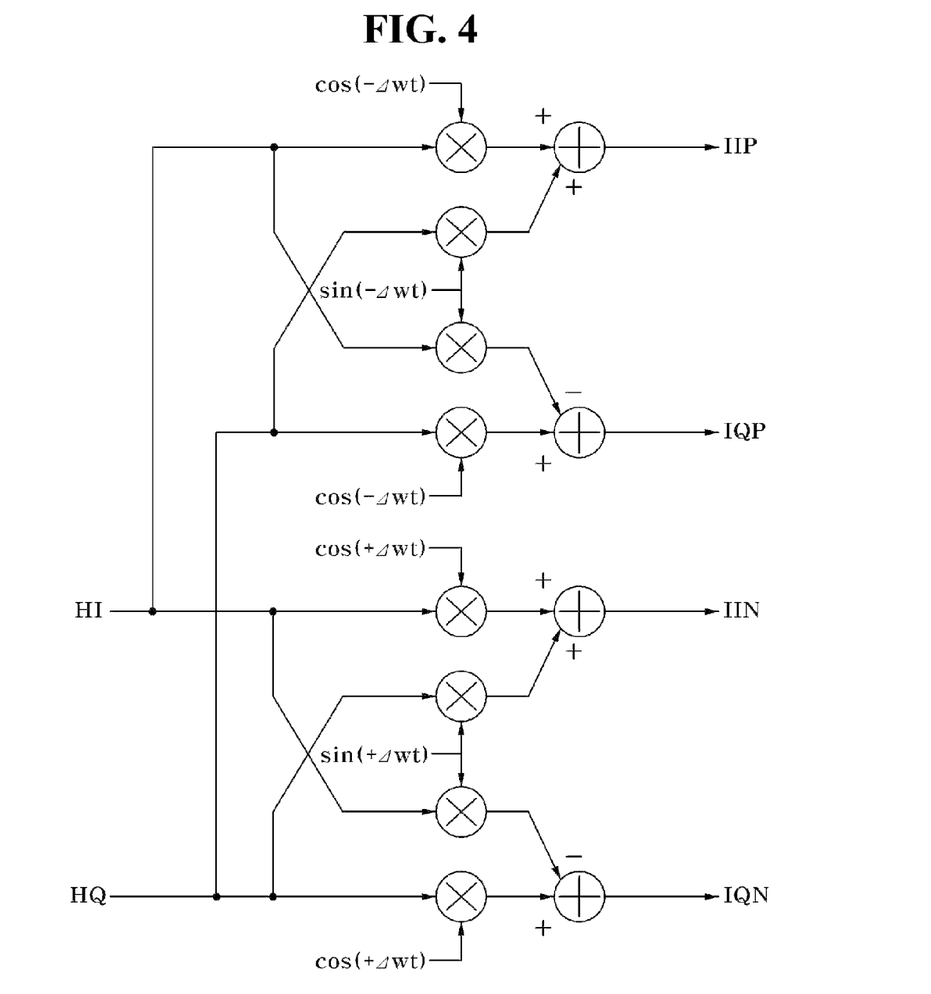
FIG. 4 is a diagram illustrating an example of a derotator of FIG. 1.

FIG. 4 is a diagram illustrating an example of a derotator, which may be used for the derotator 250 of FIG. 1. As illustrated in FIG. 4, the derotator 250 can include eight multipliers, two adders and two subtractors. The derotator 250 carries out an operation expressed in equation 6, for example by including components shown.

$$IIP = (HI \times \cos(-\Delta\omega \times t)) + (HQ \times \sin(-\Delta\omega \times t))$$

$$IQP = (HQ \times \cos(-\Delta\omega \times t)) - (HI \times \sin(-\Delta\omega \times t))$$

$$IIN = (HI \times \cos(\Delta\omega \times t)) + (HQ \times \sin(\Delta\omega \times t))$$

$$IQN = (HQ \times \cos(\Delta\omega \times t)) - (HI \times \sin(\Delta\omega \times t)) \quad \text{[Equation 6]}$$

The controller 210 can output a control signal (e.g., a control signal drt_f) during the period of measuring the Rx IQ imbalance so that Δω has a value obtained by subtracting the angular frequency of the second local oscillator 155 from that of the first local oscillator 150, and output the control signal drt_f during the period of measuring the Tx/Rx IQ imbalance (or the Tx IQ imbalance) so that Δω is the angular frequency of the tone generated by the rotator 220.

Therefore, IIP and IQP obtained by derotating the input signals HI and HQ by an amount of Δω can correspond to signals without the IQ imbalance (hereinafter referred to as a "wanted signal"), and IIN and IQN obtained by derotating the input signals HI and HQ by an amount of −Δω can correspond to image signals generated due to the IQ imbalance (hereinafter referred to as a "image signal").

For example, during the period of measuring the Rx IQ imbalance, Δω corresponds to the value obtained by subtracting the angular frequency of the second local oscillator 155 from that of the first local oscillator 150, IIP and IQP correspond to the wanted signal, and IIN and IQN corresponds to the image signals generated due to the IQ imbalance of the IQ down-conversion mixer 130. In addition, during the period of measuring the Tx/Rx IQ imbalance, Δω corresponds to angular frequency of the tone generated by the rotator 220, IIP and IQP correspond to the wanted signal, and IIN and IQN corresponds to the image signals generated due to the IQ imbalance of the IQ up-conversion mixer 110 and the IQ down-conversion mixer 130. Moreover, during the period of measuring the Tx IQ imbalance, Δω corresponds to angular frequency of the tone generated by the rotator 220, IIP and IQP correspond to the wanted signal, and IIN and IQN corresponds to the image signals generated due to the IQ imbalance of the IQ up-conversion mixer 110.

Since IIP and IQP can include a signal (having an angular frequency of Δω) other than the wanted signal, IIN and IQN can include a signal (having the angular frequency of Δω) other than the image signal, such high frequency signals should be removed by the DC estimator 260 that receives the output of the derotator 250.

The derotator 250 may be variously or diversely embodied. For instance, a number of the multipliers and the adders may be reduced through multiplexing. For example, a single rotator may be used to embody the DC estimator 260 instead of two rotators in contrast to an embodiment illustrated in FIG. 4. In such case, IIP and IQP obtained by derotating the input signals HI and HQ by Δω can be outputted during a first period, and IIN and IQN obtained by derotating the input signals HI and HQ by −Δω can be outputted during a second period.

Figure 5:
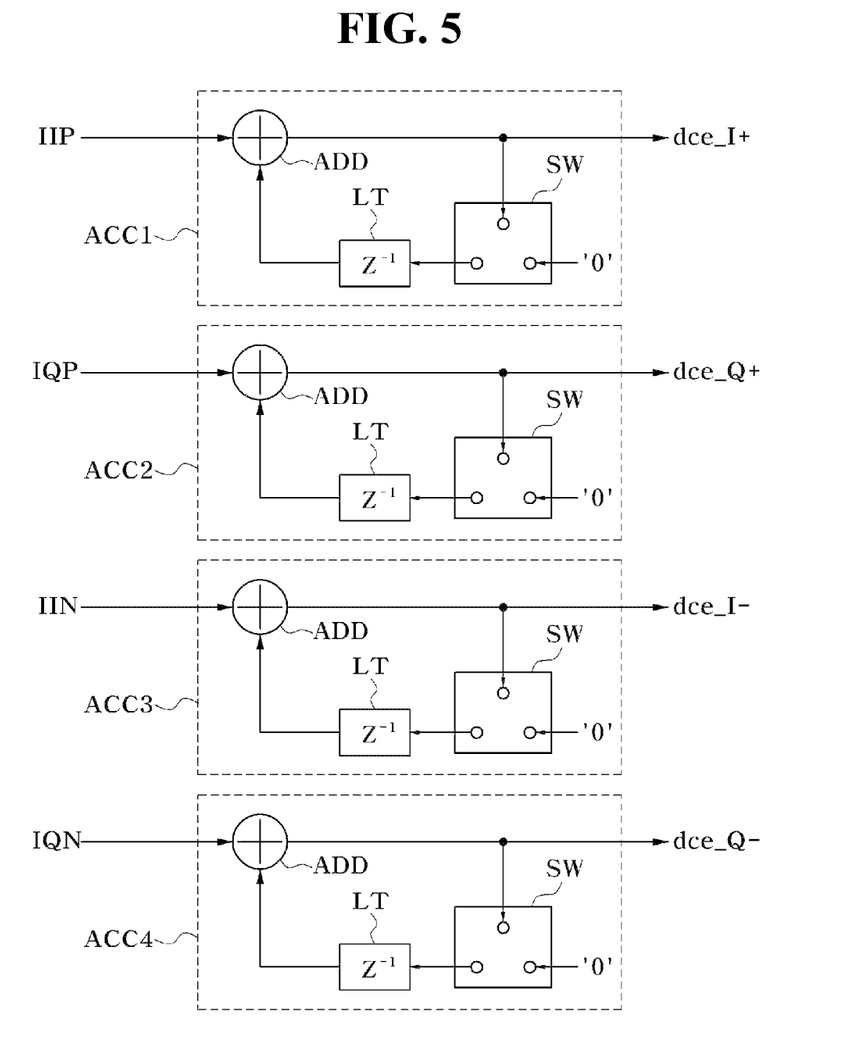
FIG. 5 is a diagram illustrating an example where an accumulator includes a DC estimator.

FIG. 5 is a diagram illustrating an example where an accumulator is used as a DC estimator 260. As illustrated in FIG. 5, the DC estimator 260 can include four accumulators ACC1, ACC2, ACC3 and ACC4. Each of the accumulators ACC1, ACC2, ACC3 and ACC4 preferably outputs a result obtained by accumulating the input signal IIP, IQP, IIN or IQN. In order to achieve this, each of the accumulators ACC1, ACC2, ACC3 and ACC4 may comprise an adder Add, a switch SW and a latch LT.

However, the DC estimator 260 may reduce a number of the accumulators via multiplexing similar to the derotator 250.

Figure 6:
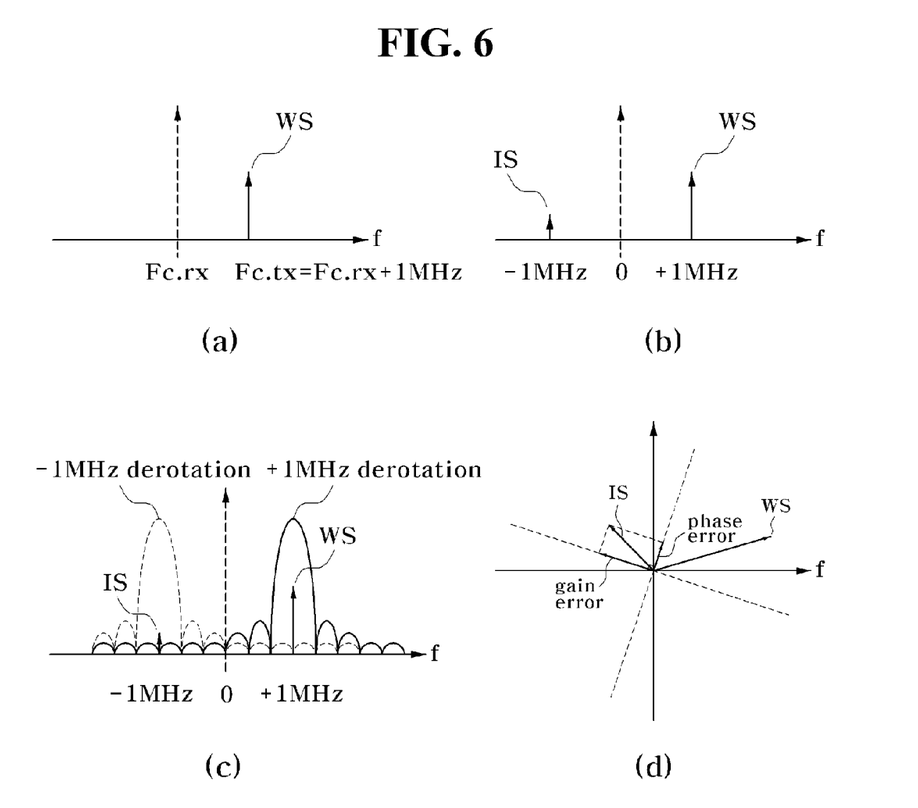
FIG. 6 is a diagram illustrating a principle for measuring an Rx IQ imbalance in accordance with the present general inventive concept.

FIG. 6 is a diagram illustrating exemplary operations for measuring the Rx IQ imbalance in accordance with the present general inventive concept. An exemplary embodiment of a method for measuring the IQ imbalance is described using and may be applied to the embodiment of FIG. 1, however, such a method embodiment is not intended to be limited thereby.

In order to measure the IQ imbalance, test_I and test_Q of the DC component are outputted from the controller 210 while the rotator 220 and the Tx IQ imbalance compensator 230 are not in operation, e.g. while the control signals rot_f, dp_tx and dg_tx are applied such that the rotation is not carried out in the rotator 220 and the Tx IQ imbalance is not compensated for in the Tx IQ imbalance compensator 230. Therefore, the IQ signals BI and BQ of the DC component are inputted to the first local oscillator 150. In addition, the control signal test_en is applied to the feedback switch 125 so as to form the feedback path, and a control signal aux_en is applied to the IQ switch 160 so that the output of the first local oscillator 150 is inputted to the IQ up-conversion mixer 110. Moreover, the control signals dp_rx and dg_rx are applied so that the Rx IQ imbalance compensator 240 does not operate, e.g. the Rx IQ imbalance is not compensated for in the Rx IQ imbalance compensator 240. In addition, a control signal drt_f is applied to the derotator 250 so that the derotator 250 outputs the IQ signals IIP and IQP obtained by derotating the input IQ signals HI and HQ by an amount of [F1−F2], and the IQ signals IIN and IQN obtained by derotating the input IQ signals HI and HQ by an amount of −[F1−F2] where F1 is an output frequency of the first local oscillator and F2 is an output frequency of the second local oscillator.

FIG. 6(a) illustrates an output signal of the IQ up-conversion mixer 110. As shown, Fc.tx represents the frequency of the in-phase signal and the quadrature signal transmitted to the IQ up-conversion mixer 110, e.g., the output frequency F1 of the first local oscillator, and Fc.rx represents the frequency of the in-phase signal and the quadrature signal transmitted to the IQ down-conversion mixer 130, e.g. the output frequency F2 of the second local oscillator.

In addition, FIG. 6(a) illustrates the output signal when [F1−F2] is 1 MHz. Since the IQ signals CI and CQ of the DC component are inputted to the IQ up-conversion mixer 110, the image signal due to the Tx IQ imbalance (the IQ imbalance of the IQ up-conversion mixer 110) is not generated in the IQ output signals DI and DQ of the IQ up-conversion mixer 110 and only the wanted signal WS is generated as shown in FIG. 6(a).

FIG. 6(b) illustrates an output signal of the IQ down-conversion mixer 130. As shown, the desired signal WS is positioned at [F1−F2], e.g. 1 MHz, and the image signal IS due to the Rx IQ imbalance (the IQ imbalance of the IQ down-conversion mixer 130) is positioned at −[F1−F2], e.g. −1 MHz. Therefore, when the output signal of the IQ down-conversion mixer 130 is derotated by the amount of [F1−F2], e.g. 1 MHz and a DC signal is then extracted, the wanted signal WS may be obtained. Moreover, when the output signal of the IQ down-conversion mixer 130 is derotated by the amount of −[F1−F2], e.g. −1 MHz and the DC signal is then extracted, the image signal IS may be obtained. The derotation and the extraction of the DC signal can be carried out by the derotator 250 and the DC estimator 260, respectively.

FIG. 6(c) illustrates an exemplary filter characteristic of the derotator 250 and the DC estimator 260. In accordance with the filter characteristic in case of the derotation of [F1−F2], e.g. +1 MHz shown in a solid line, the wanted signal WS can be passed through but the image signal IS can be blocked. In addition, in accordance with the filter characteristic in case of the derotation of −[F1−F2], e.g. −1 MHz shown in a dotted line, the image signal IS can be passed through but the wanted signal WS can be blocked. Thus, when the derotator 250 and the DC estimator 260 are used, the wanted signal WS and the image signal IS may be selected without using a separate sharp analog filter.

FIG. 6(d) illustrates vectors being outputted from the DC estimator 260, e.g. the vectors IIP and IQP of the wanted signal WS and the vectors IIN and IQN of the image signal IS. The vectors IIN and IQN of the image signal IS may be expressed in terms of the vectors IIP and IQP of the wanted signal WS, for example as shown in equation 7.

$$[IIN,IQN]=dg\_r[IIP,-IQP]+dp\_r[IQP,IIP]$$ [Equation 7]

As expressed in equation 7, the vector of the image signal IS corresponds to a sum of two perpendicular vectors, e.g. dg_r[IIP, −IQP] and dp_r[IQP, IIP]. Therefore, the gain error dg_r and the phase error dp_r may be simply obtained through a vector operation, for example as expressed in equation 8.

$$dg\_r=([IIN,IQN]\cdot[IIP,-IQP])/(IIP2+IQP2)$$

$$dp\_r=([IIN,IQN]\cdot[IQP,IIP])/(IIP2+IQP2)$$ [Equation 8]

"·" represents a scalar product in equation 8. Operations expressed in equation 8 may be carried out by the controller 210. The controller 210 can transmit the control signals dp_rx and dg_rx corresponding to the obtained gain error dg_r and phase error dp_r to the Rx IQ imbalance compensator 240. The Rx IQ imbalance compensator 240 can compensate for the gain error dg_r and/or the phase error dp_r according to the control signals dp_rx and dg_rx, which can compensate for the Rx IQ imbalance.

Operations for measuring the Rx IQ imbalance and/or operations for compensating for the Rx IQ imbalance may include various embodiments. In one embodiment, the Rx IQ imbalance may be compensated for by repeating a process where the Rx IQ imbalance compensator 240 compensates for the Rx IQ imbalance. For example, the Rx IQ imbalance compensator 240 compensates for the Rx IQ imbalance (e.g., first Rx IQ imbalance) according to the control signals dp_rx and dg_rx, the derotator 250 and the DC estimator 260 receives the outputs HI and HQ of the Rx IQ imbalance compensator 240 to measure a remaining Rx IQ imbalance, and the Rx IQ imbalance compensator 240 compensates for the Rx IQ imbalance (e.g., remaining or second Rx IQ imbalance) according to new control signals dp_rx and dg_rx having the measured the Rx IQ imbalance (e.g., first Rx IQ imbalance) reflected thereto. In such an embodiment, an initial value of the control signals dp_rx and dg_rx transmitted to the Rx IQ imbalance compensator 240 may be (0, 0), a prescribed amount, a value corresponding to a gain error and a phase error measured in a manufacturing process of the transceiving circuit or the like. When the IQ imbalance is compensated for by the repetitive measurement and the compensation, the gain error dg_r and the phase error dp_r of an accurate value is not required to be obtained, and the gain error dg_r and the phase error dp_r may be obtained by equation 9.

$$dg\_r=([IIN,IQN]\cdot[IIP,-IQP])$$

$$dp\_r=([IIN,IQN]\cdot[IQP,IIP])$$ [Equation 9]

Figure 7:
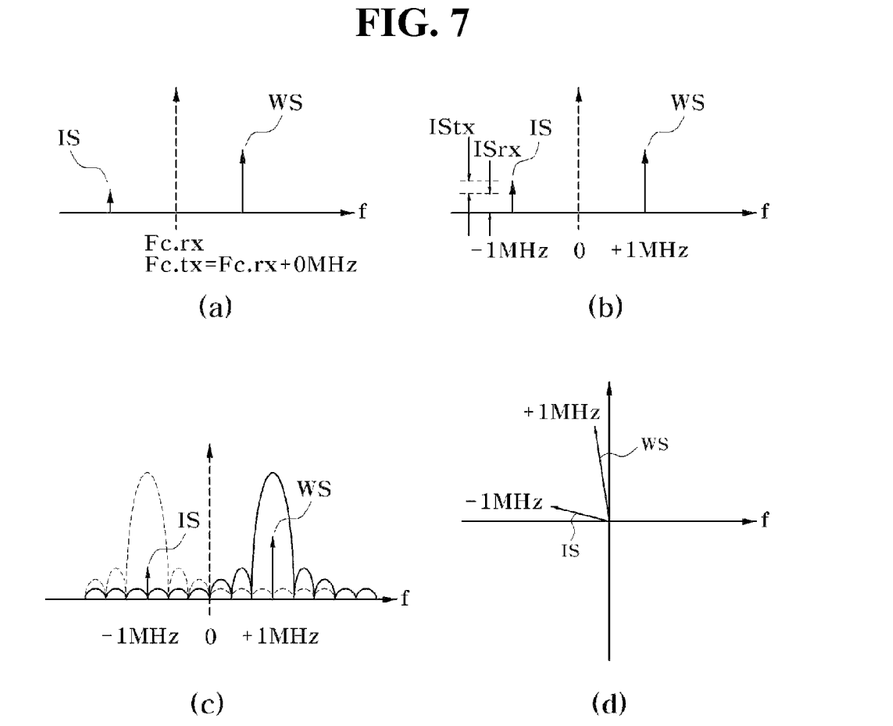
FIG. 7 is a diagram illustrating a principle for measuring a Tx/Rx IQ imbalance in accordance with the present general inventive concept.

FIG. 7 is a diagram illustrating exemplary operations for measuring the Tx/Rx IQ imbalance in accordance with the present general inventive concept. An exemplary embodiment of a method for measuring the Tx/Rx IQ imbalance can be described using and may be applied to the embodiment of FIG. 1, however, such a method embodiment is not intended to be limited thereby.

In order to measure the Tx/Rx IQ imbalance, the rotator 220 generates the predetermined tone (e.g., the tone of 1 MHz in this embodiment), and the Tx IQ imbalance compensator 230 is not in operation, e.g. the rotator 220 carries out a rotation of a predetermined frequency ΔF. Thus, while the control signals rot_f, dp_tx and dg_tx are applied so that the Tx IQ imbalance is not compensated for in the Tx IQ imbalance compensator 230, test_I and test_Q of the DC component is outputted from the controller 210. Therefore, the IQ signals BI and BQ of the DC component are inputted to the IQ DAC 105. In addition, the control signal test_en is applied to the feedback switch 125 to form the feedback path, and a control signal aux_en is applied to the IQ switch 160 so that the output of the second local oscillator LO2 is inputted to the IQ up-conversion mixer 110. Moreover, the control signals dp_rx and dg_rx are applied so that the Rx IQ imbalance compensator 240 does not operate. The control signal drt_f is applied to the derotator 250 so that the derotator 250 outputs the IQ signals IIP and IQP obtained by derotating the input IQ signals HI and HQ by an amount of ΔF, and the IQ signals IIN and IQN obtained by derotating the input IQ signals HI and HQ by an amount of −ΔF.

FIG. 7(a) illustrates the output signal of the IQ up-conversion mixer 110. As shown, Fc.tx represents the frequency of the in-phase signal and the quadrature signal transmitted to the IQ up-conversion mixer 110, e.g. the output frequency F2 of the second local oscillator 155, and Fc.rx represents the frequency of the in-phase signal and the quadrature signal transmitted to the IQ down-conversion mixer 130, e.g. the output frequency F2 of the second local oscillator. Since the IQ signals CI and CQ of the predetermined tone are inputted to the IQ up-conversion mixer 110, the IQ output signals DI and DQ of the IQ up-conversion mixer 110 include the wanted signal WS and the image signal IS due to the Tx IQ imbalance.

FIG. 7(b) illustrates the output signal of the IQ down-conversion mixer 130. As shown, the desired signal WS is positioned at ΔF, e.g. 1 MHz, and the image signal IS is positioned at −ΔF, e.g. −1 MHz. The image signal IS corresponds to a sum of the image signal IStx due to the Tx IQ imbalance (e.g., the image signal generated in the IQ up-conversion mixer 110) and the image signal ISrx due to the Rx IQ imbalance (e.g., the image signal generated in the IQ down-conversion mixer 130), e.g. the image signal due to the Tx/Rx IQ imbalance. Therefore, when the output signal of the IQ down-conversion mixer 130 is derotated by the amount of ΔF, e.g. 1 MHz and the DC signal is then extracted, the wanted signal WS may be obtained. Moreover, when the output signal of the IQ down-conversion mixer 130 is derotated by the amount of −ΔF, e.g. −1 MHz and the DC signal is then extracted, the image signal IS may be obtained. The derotation and the extraction of the DC signal can be carried out by the derotator 250 and the DC estimator 260, respectively.

FIG. 7(c) illustrates an exemplary filter characteristic of the derotator 250 and the DC estimator 260. A solid line represents the filter characteristic in case of the derotation of by the amount of ΔF, e.g. +1 MHz, and a dotted line represents the filter characteristic in case of the derotation of by the amount of −ΔF, e.g. −1 MHz.

FIG. 7(d) illustrates exemplary vectors being outputted from the DC estimator 260, e.g. the vectors IIP and IQP of the wanted signal WS and the vectors IIN and IQN of the image signal IS. Similar to FIG. 6, the gain error dg_r and the phase error dp_r due to the Tx/Rx IQ imbalance may be obtained, for example as expressed in equation 10 or equation 11.

$$dg\_tr=([IIN,IQN]\cdot[IIP,-IQP])/(IIP2+IQP2)$$

$$dp\_tr=([IIN,IQN]\cdot[IQP,IIP])/(IIP2+IQP2) \qquad \text{[Equation 10]}$$

$$dg\_tr=([IIN,IQN]\cdot[IIP,-IQP])$$

$$dp\_tr=([IIN,IQN]\cdot[IQP,IIP]) \qquad \text{[Equation 11]}$$

When the gain error dg_r and the phase error dp_r due to the Rx IQ imbalance and the gain error dg_r and the phase error dp_r due to the Tx/Rx IQ imbalance are obtained, the gain error dg_r and the phase error dp_r due to the Tx IQ imbalance may be obtained from equation 12.

$$dg\_t=dg\_tr-dg\_r$$

$$dp\_t=dp\_tr-dp\_r \qquad \text{[Equation 12]}$$

Figure 8:
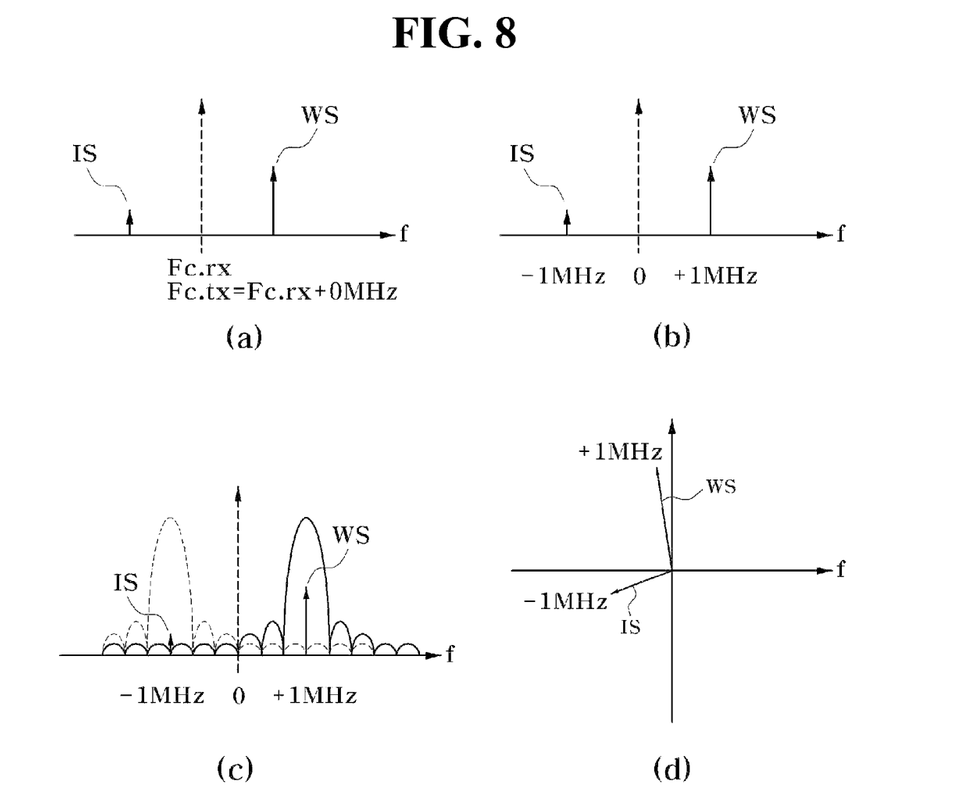
FIG. 8 is a diagram illustrating a principle for measuring a Tx IQ imbalance in accordance with the present general inventive concept.

FIG. 8 is a diagram illustrating exemplary operations for measuring Tx IQ imbalance in accordance with the present general inventive concept. The exemplary embodiment of a method for measuring the Tx IQ imbalance can be described using and may be applied to the embodiment of FIG. 1, however, such a method embodiment is not intended to be limited thereby.

In order to measure the Tx IQ imbalance, the rotator 220 can generate a predetermined tone (e.g., the tone of 1 MHz in this embodiment), and test_I and test_Q of the DC component is outputted from the controller 210 while the Tx IQ imbalance compensator 230 is not in operation. Therefore, the IQ signals BI and BQ of the DC component are inputted to the IQ DAC 105. In addition, the control signal test_en is applied to the feedback switch 125 to form the feedback path, and the control signal aux_en is applied to the IQ switch 160 so that the output of the second local oscillator LO2 is inputted to the IQ up-conversion mixer 110. Moreover, the control signals dp_rx and dg_rx are applied so that the Rx IQ imbalance compensator 240 preferably compensates for the Rx IQ imbalance. The control signal drt_f is applied to the derotator 250 so that the derotator 250 outputs the IQ signals IIP and IQP obtained by derotating the input IQ signals HI and HQ by an amount of ΔF, and the IQ signals IIN and IQN obtained by derotating the input IQ signals HI and HQ by an amount of −ΔF.

FIG. 8(a) illustrates the output signal of the IQ up-conversion mixer 110. As shown, Fc.tx represents the frequency of the in-phase signal and the quadrature signal transmitted to the IQ up-conversion mixer 110, e.g. the output frequency F2 of the second local oscillator 155, and Fc.rx represents the frequency of the in-phase signal and the quadrature signal transmitted to the IQ down-conversion mixer 130, e.g. the output frequency F2 of the second local oscillator. Since the IQ signals CI and CQ of the predetermined tone are inputted to the IQ up-conversion mixer 110, the IQ output signals DI and DQ of the IQ up-conversion mixer 110 include the wanted signal WS and the image signal IS due to the Tx IQ imbalance.

FIG. 8(b) illustrates the output signal of the IQ down-conversion mixer 130. As shown, the desired signal WS is positioned at ΔF, e.g. 1 MHz, and the image signal IS is positioned at −ΔF, e.g. −1 MHz. The image signal IS corresponds to the image signal generated due to the Tx IQ imbalance (e.g., the image signal due to the Rx IQ imbalance is compensated for by the Rx IQ imbalance compensator 240). Therefore, when the output signal of the IQ down-conversion mixer 130 is derotated by the amount of ΔF, e.g. 1 MHz and the DC signal is then extracted, the wanted signal WS may be obtained. Moreover, when the output signal of the IQ down-conversion mixer 130 is derotated by the amount of −ΔF, e.g. −1 MHz and the DC signal is then extracted, the image signal IS may be obtained. The derotation and the extraction of the DC signal can be carried out by the derotator 250 and the DC estimator 260, respectively.

FIG. 8(c) illustrates an exemplary filter characteristic of the derotator 250 and the DC estimator 260. A solid line represents the filter characteristic in case of the derotation of by the amount of ΔF, e.g. +1 MHz, and a dotted line represents the filter characteristic in case of the derotation of by the amount of −ΔF, e.g. −1 MHz.

FIG. 8(d) illustrates exemplary vectors being outputted from the DC estimator 260, e.g. the vectors IIP and IQP of the wanted signal WS and the vectors IIN and IQN of the image signal IS. Similar to FIG. 6, the gain error dg_r and the phase error dp_r due to the Tx/Rx IQ imbalance may be obtained as expressed in equation 13 or equation 14.

$$dg\_t=([IIN,IQN]\cdot[IIP,-IQP])/(IIP2+IQP2)$$

$$dp\_t=([IIN,IQN]\cdot[IQP,IIP])/(IIP2+IQP2) \quad \text{[Equation 13]}$$

$$dg\_t=([IIN,IQN]\cdot[IIP,-IQP])$$

$$dp\_t=([IIN,IQN]\cdot[IQP,IIP]) \quad \text{[Equation 14]}$$

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of apparatus and/or methods according to the present general inventive concept have various advantages, for example, an IQ imbalance may be measured.

Embodiments for measuring the IQ imbalance can obtain an IQ imbalance by obtaining an image signal due to the IQ imbalance using a derotator and a DC estimator to measure the IQ imbalance.

Embodiments for measuring an IQ imbalance in accordance with the application can obtain a desired or wanted signal and/or its image signal caused by the IQ imbalance without using the sharp analog filter.

Embodiments for measuring the IQ imbalance in accordance with the application can rapidly and/or accurately measure an IQ imbalance, which can reduce a necessary time for measurement and compensation.

Embodiments of an apparatus or method for measuring the IQ imbalance in accordance with the application can be advantageous in that IQ imbalance errors such as the Tx IQ imbalance and the Rx IQ imbalance may be measured using the feedback path.

Although embodiments of the present general inventive concept have been illustrated and described, it would be appreciated by those skilled in the art that changes may be made in these embodiments without departing from the principles and spirit of the general inventive concept, the scope of which is defined in the claims and their equivalents. As used in this disclosure, the term "preferably" is non-exclusive and means "preferably, but not limited to." Terms in the claims should be given their broadest interpretation consistent with the general inventive concept as set forth in this description. For example, the terms "coupled" and "connect" (and derivations thereof) are used to connote both direct and indirect connections/couplings. As another example, "having" and "including", derivatives thereof and similar transitional terms or phrases are used synonymously with "comprising" (i.e., all are considered "open ended" terms)—only the phrases "consisting of" and "consisting essentially of" should be considered as "close ended". Claims are not intended to be interpreted under 112 sixth paragraph unless the phrase "means for" and an associated function appear in a claim and the claim fails to recite sufficient structure to perform such function.

What is claimed is:

1. A phase error detector to measure an in-phase and quadrature (IQ) imbalance error using a first IQ signal including a first tone having at a first angular frequency and a second tone having a second angular frequency, the second tone corresponding to an image signal by the IQ imbalance of the first tone, the detector comprising:
   one or more of: a circuit, a digital signal processor (DSP), or a microcontroller unit (MCU), the circuit, DSP, and/or MCU configured to include:
   a derotator to derotate the first IQ signal by the first angular frequency to obtain a second IQ signal and to derotate the first IQ signal by the second angular frequency to obtain a third IQ signal;
   a DC estimator to obtain a fourth IQ signal corresponding to a DC component of the second IQ signal and a fifth IQ signal corresponding to a DC component of the third IQ signal; and
   a controller to determine a first error by the IQ imbalance from the fourth IQ signal and the fifth IQ signal.

2. The detector in accordance with claim 1, wherein the derotator outputs I2 corresponding to [I1×cos(Δωxt)−Q1×sin(Δωxt)], Q2 corresponding to [I1×sin(Δωxt)+Q1×cos(Δω×t)], I3 corresponding to [I1×cos(Δωxt)+Q1×sin(Δωxt)] and Q3 corresponding to [−I1×sin(Δωxt)+Q1×cos(Δωxt)], where I1 is an I component signal of the first IQ signal, Q1 is a Q component signal of the first IQ signal, I2 is an I component signal of the second IQ signal, Q2 is a Q component signal of the second IQ signal, I3 is an I component signal of the third IQ signal, Q3 is a Q component signal of the third IQ signal, Δω is the first angular frequency and −Δω is the second angular frequency.

3. The detector in accordance with claim 1, wherein the DC estimator comprises an accumulator or a low pass filter.

4. The detector in accordance with claim 1, the controller to obtain a phase error corresponding to [(I4×Q5+Q4×I5)÷(I4$^2$+Q4$^2$)], where I4 is an I component signal of the fourth IQ signal, Q4 is a Q component signal of the fourth IQ signal, I5 is an I component signal of the fifth IQ signal, and Q5 is a Q component signal of the fifth IQ signal.

5. The detector in accordance with claim 1, the controller to obtain a phase error corresponding to [I4×Q5+Q4×I5], where I4 is an I component signal of the fourth IQ signal, Q4 is a Q component signal of the fourth IQ signal, I5 is an I component signal of the fifth IQ signal, and Q5 is a Q component signal of the fifth IQ signal.

6. The detector in accordance with claim 1, further comprising:
   a signal generator to output a sixth IQ signal of a DC component during a first period and the sixth IQ signal of the first angular frequency during a second period;
   an IQ DAC to output an analog seventh IQ signal corresponding to the received sixth IQ signal;
   an IQ up-conversion mixer to output an eighth IQ signal obtained by up-converting the seventh IQ signal by an amount of [a third angular frequency+the first angular frequency] during the first period and to output the eighth IQ signal obtained by up-converting the seventh IQ signal by an amount of the third angular frequency during the second period;
   an IQ down-conversion mixer to down-convert the eighth IQ signal by an amount of the third angular frequency to output a ninth IQ signal; and
   an IQ ADC to output the first IQ signal obtained by converting the ninth IQ signal to a digital signal,
   wherein the first angular frequency and the second angular frequency have a same amplitude and an opposite sign.

7. The detector in accordance with claim 6, further comprising:
a reception IQ imbalance compensator to compensate the tenth IQ signal for the IQ imbalance to output the first IQ signal.

8. The detector in accordance with claim 6, further comprising:
a first local oscillator to output a first LO signal of [the third angular frequency+the first angular frequency];
a second local oscillator to output a second LO signal of the third angular frequency transmitted to the IQ down-conversion mixer; and
an IQ switch to transmit the first LO signal to the IQ up-conversion mixer during the first period and the second LO signal to the IQ up-conversion mixer during the second period,
wherein a single clock is divided to be transmitted to the first local oscillator, the second local oscillator and the derotator.

9. The detector in accordance with claim 6, wherein the signal generator is configured to output I6 corresponding to I11 and Q6 corresponding to Q11 during the first period, and I6 corresponding to $[I11 \times \cos(\Delta\omega \times t) + Q11 \times \sin(\Delta\omega \times t)]$ and Q6 corresponding to $[-I11 \times \sin(\Delta\omega \times t) + Q11 \times \cos(\Delta\omega \times t)]$ during the second period, where I11 and Q11 are an I component signal and a Q component signal of a signal of a DC component inputted to the rotator, respectively, I6 and Q6 are an I component signal and a Q component signal of the sixth IQ signal, respectively, and $\Delta\omega$ is the first angular frequency.

10. The detector in accordance with claim 1, further comprising a temperature sensor, and wherein the controller is configured to measure the first error according to a temperature measured by the temperature sensor.

11. The detector in accordance with claim 1, the controller to obtain a gain error corresponding to $[(I4 \times I5 - Q4 \times Q5) \div (I4^2 + Q4^2)]$, where I4 is an I component signal of the fourth IQ signal, Q4 is a Q component signal of the fourth IQ signal, I5 is an I component signal of the fifth IQ signal, and Q5 is a Q component signal of the fifth IQ signal.

12. The detector in accordance with claim 1, wherein the controller is configured to obtain a gain error corresponding to $[I4 \times I5 - Q4 \times Q5]$, where I4 is an I component signal of the fourth IQ signal, Q4 is a Q component signal of the fourth IQ signal, I5 is an I component signal of the fifth IQ signal, and Q5 is a Q component signal of the fifth IQ signal.

13. The detector in accordance with claim 1, wherein the first error is a phase error or a gain error.

14. A method for measuring an in-phase and quadrature (IQ) imbalance error using a first IQ signal including a first tone positioned at a first angular frequency and a second tone having a second angular frequency, the second tone corresponding to an image signal by the IQ imbalance of the first tone, the method comprising:
performing steps automatically by one or more of a circuit, a digital signal processor (DSP), or a microcontroller unit (MCU), the steps including:
derotating the first IQ signal by the first angular frequency to obtain a second IQ signal and derotating the first IQ signal by the second angular frequency to obtain a third IQ signal;
obtaining a fourth IQ signal corresponding to a DC component of the second IQ signal and a fifth IQ signal corresponding to a DC component of the third IQ signal; and
obtaining a first error from the fourth IQ signal and the fifth IQ signal.

15. The method in accordance with claim 14, wherein I2 corresponds to $[I1 \times \cos(\Delta\omega \times t) - Q1 \times \sin(\Delta\omega \times t)]$, Q2 corresponds to $[I1 \times \sin(\Delta\omega \times t) + Q1 \times \cos(\Delta\omega \times t)]$, I3 corresponds to $[I1 \times \cos(\Delta\omega \times t) + Q1 \times \sin(\Delta\omega \times t)]$ and Q3 corresponds to $[-I1 \times \sin(\Delta\omega \times t) + Q1 \times \cos(\Delta\omega \times t)]$, where I1 is an I component signal of the first IQ signal, Q1 is a Q component signal of the first IQ signal, I2 is an I component signal of the second IQ signal, Q2 is a Q component signal of the second IQ signal, I3 is an I component signal of the third IQ signal, Q3 is a Q component signal of the third IQ signal, $\Delta\omega$ is the first angular frequency and $-\Delta\omega$ is the second angular frequency.

16. The method in accordance with claim 14, wherein a phase error corresponds to $[(I4 \times Q5 + Q4 \times I5) \div (I4^2 + Q4^2)]$ or $[I4 \times Q5 + Q4 \times I5]$, where I4 is an I component signal of the fourth IQ signal, Q4 is a Q component signal of the fourth IQ signal, I5 is an I component signal of the fifth IQ signal, and Q5 is a Q component signal of the fifth IQ signal.

17. The method in accordance with claim 14, further comprising:
up-converting a sixth IQ signal of a DC component by an amount of [a third angular frequency+the first angular frequency] using an IQ up-conversion mixer to obtain a seventh IQ signal; and
down-converting a sum of an I component signal and a Q component signal of the seventh IQ signal by an amount of the third angular frequency using an IQ down-conversion mixer to obtain the first IQ signal,
wherein the first angular frequency and the second angular frequency have a same amplitude and an opposite sign, and
wherein the obtained first error corresponds to a phase error by a reception IQ imbalance.

18. The method in accordance with claim 14, further comprising, prior to the derotating:
up-converting a sixth IQ signal of the first angular frequency by an amount of a third angular frequency using an IQ up-conversion mixer to obtain a seventh IQ signal; and
down-converting a sum of an I component signal and a Q component signal of the seventh IQ signal by an amount of the third angular frequency using an IQ down-conversion mixer to obtain the first IQ signal,
wherein the first angular frequency and the second angular frequency have a same amplitude and an opposite sign, and
wherein the obtained first error corresponds to a phase error by a transmission/reception IQ imbalance.

19. The method in accordance with claim 14, further comprising:
up-converting a sixth IQ signal of the first angular frequency by an amount of a third angular frequency using an IQ up-conversion mixer to obtain a seventh IQ signal;
down-converting a sum of an I component signal and a Q component signal of the seventh IQ signal by an amount of the third angular frequency using an IQ down-conversion mixer to obtain an eighth IQ signal; and
obtaining the first IQ signal by compensating the eighth IQ signal for the IQ imbalance,
wherein the first angular frequency and the second angular frequency have a same amplitude and an opposite sign, and
wherein the obtained first error corresponds to a phase error by a transmission IQ imbalance.

20. The method in accordance with claim 14, wherein a gain error corresponds to $[(I4 \times I5 - Q4 \times Q5) \div (I4^2 + Q4^2)]$ or $[I4 \times I5 - Q4 \times Q5]$, where I4 is an I component signal of the fourth IQ signal, Q4 is a Q component signal of the fourth IQ signal, I5 is an I component signal of the fifth IQ signal, and Q5 is a Q component signal of the fifth IQ signal.

21. The method in accordance with claim 14, further comprising:
- up-converting a sixth IQ signal of a DC component by an amount of [a third angular frequency+the first angular frequency] using an IQ up-conversion mixer to obtain a seventh IQ signal; and
- down-converting a sum of an I component signal and a Q component signal of the seventh IQ signal by an amount of the third angular frequency using an IQ down-conversion mixer to obtain the first IQ signal,
- wherein the first angular frequency and the second angular frequency have a same amplitude and an opposite sign, and
- wherein the obtained first error corresponds to a gain error by a reception IQ imbalance.

22. The method in accordance with claim 14, further comprising, prior to the derotating:
- up-converting a sixth IQ signal of the first angular frequency by an amount of a third angular frequency using an IQ up-conversion mixer to obtain a seventh IQ signal; and
- down-converting a sum of an I component signal and a Q component signal of the seventh IQ signal by an amount of the third angular frequency using an IQ down-conversion mixer to obtain the first IQ signal,
- wherein the first angular frequency and the second angular frequency have a same amplitude and an opposite sign, and
- wherein the obtained first error corresponds to a gain error by a transmission/reception IQ imbalance.

23. The method in accordance with claim 14, further comprising:
- converting a sixth IQ signal of the first angular frequency by an amount of a third angular frequency using an IQ up-conversion mixer to obtain a seventh IQ signal;
- converting a sum of an I component signal and a Q component signal of the seventh IQ signal by an amount of the third angular frequency using an IQ down-conversion mixer to obtain an eighth IQ signal; and
- obtaining the first IQ signal by compensating the eighth IQ signal for the IQ imbalance,
- wherein the first angular frequency and the second angular frequency have a prescribed relationship, and
- wherein the obtained first error corresponds to a gain error by a transmission IQ imbalance.

\* \* \* \* \*